(12) United States Patent
Brite et al.

(10) Patent No.: US 6,399,109 B1
(45) Date of Patent: Jun. 4, 2002

(54) INSECTICIDE INCLUDING DISODIUM OCTABORATE TETRAHYDRATE AND METHOD FOR TREATING WOOD THEREWITH

(76) Inventors: Alan D. Brite; Terry Brite, both of P.O. Box 50610, Santa Barbara, CA (US) 93150

( * ) Notice: Subject to any disclaimer, the term of this patent is extended or adjusted under 35 U.S.C. 154(b) by 0 days.

(21) Appl. No.: 09/456,023

(22) Filed: Dec. 3, 1999

Related U.S. Application Data

(62) Division of application No. 08/994,056, filed on Dec. 19, 1997, now abandoned.

(51) Int. Cl.[7] .................. A01N 59/14; A01N 25/08; A01N 25/00
(52) U.S. Cl. .................. 424/660; 424/84; 424/409; 424/410; 424/411; 424/412; 424/413; 424/414; 424/416; 424/657; 424/658; 424/659; 424/DIG. 11
(58) Field of Search .................. 424/657–660, 424/84, 409–414, 416, DIG. 11

(56) References Cited

U.S. PATENT DOCUMENTS

| | | | |
|---|---|---|---|
| 4,299,258 A | 11/1981 | Brite | 144/1 |
| 4,438,090 A | 3/1984 | Brite | 424/7.1 |
| 4,461,758 A | 7/1984 | Brite | 424/10 |
| 4,817,329 A | 4/1989 | Forbes | 43/124 |
| 4,873,084 A | 10/1989 | Salloy | 424/656 |
| 4,958,456 A | 9/1990 | Chaudoin et al. | 43/124 |
| 5,006,562 A | 4/1991 | Steltenkamp | 514/625 |
| 5,194,323 A | 3/1993 | Savoy | 428/305.5 |
| 5,224,315 A | 7/1993 | Winter, IV | 52/309.8 |
| 5,270,108 A | 12/1993 | Savoy | 428/304.4 |
| 5,564,222 A | 10/1996 | Brody | 43/124 |
| 5,592,774 A | 1/1997 | Galyon | 43/124 |
| 5,612,094 A | 3/1997 | Schubert et al. | 427/397 |
| 5,637,298 A | 6/1997 | Stowell | 424/84 |
| 5,667,816 A | 9/1997 | Moss | 424/659 |

OTHER PUBLICATIONS

Strong, Charles A. et al., "Oral toxicity and repellency of borates to German cockroaches (Dictyoptera: Blattellidae)," Journal of Economic Entomology, vol. 86(5), pp. 1458–1463, 1993.*
CAB Abstract 95:104847, 1994.*
Morris, P.I.; Byrne, A.; "The Effect of DDAC on The Penetration of Borates Into Western Hemlock"; Forest Products Journal (1997), vol. 47, No. 4, pp. 71–73.
Morrell, J.J.; Freitag, C.M.; "Effect of Wood Moisture Content on Diffusion of Boron–Based Biocides Through Douglas Fir and Western Hemlock Lumber"; Forest Products Journal (1995), vol. 45, No. 3, pp. 51–55.
Handout by U.S. Borax, Inc., "Tim–bor® Professional Wood Preservative/Insect Control"; ©1997 (2 pages).
U.S. Borax, Inc., Tim–bor® Professional Material Safety Data Sheet, Date of Issue Dec. 1997 (4 pages).
U.S. Borax, Inc., "Tim–bor® Professional Wood Preservative/Insect Control Service Bulletin", ©1998 (12 pages).

* cited by examiner

*Primary Examiner*—John Pak
(74) *Attorney, Agent, or Firm*—Lyon & Lyon LLP

(57) ABSTRACT

A liquid insecticide solution comprising a 5% to 20% water solution of a disodium octaborate tetrahydrate ("DOT") mixture comprising disodium octaborate tetrahydrate, colored pigment, and a bittering agent of either sucrose octaacetate and denatonium benzoate, is provided. Preferably, the insecticide solution is prepared by stirring a powdered DOT mixture into water. Methods for treating wood surfaces and preparing bait stations with liquid insecticide solutions prepared with D.O.T. mixtures are also provided.

2 Claims, 1 Drawing Sheet

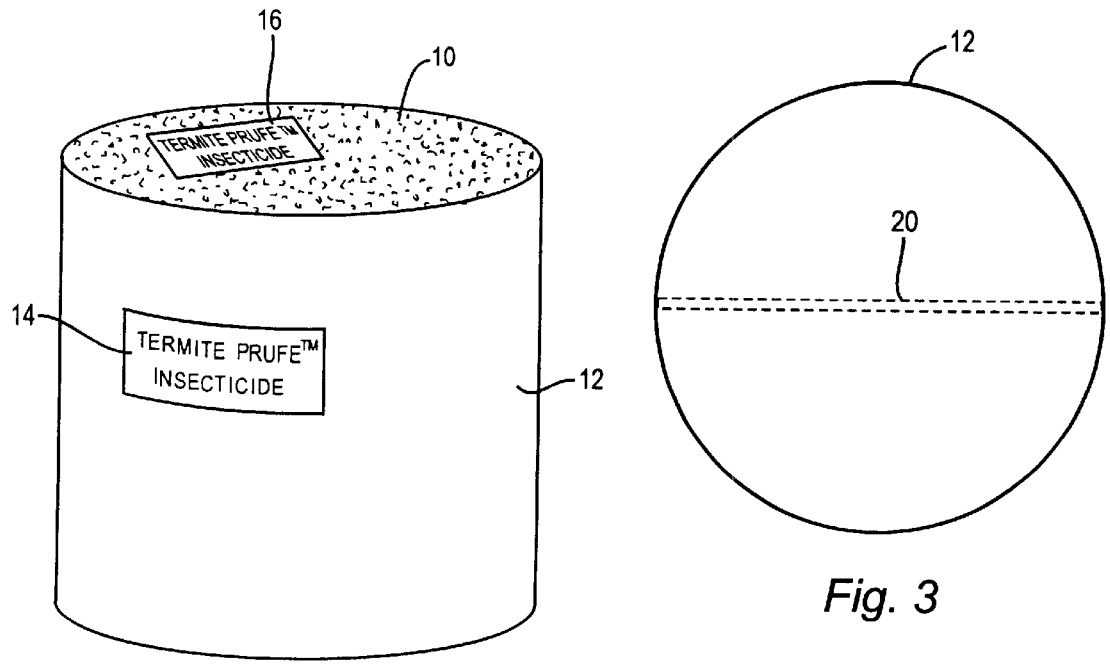
Fig. 1
Fig. 3
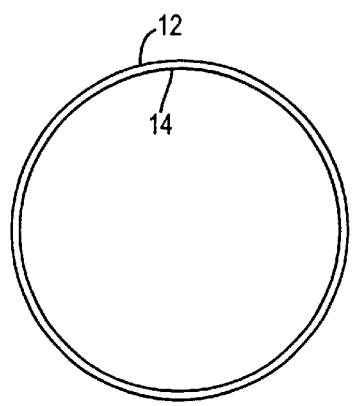
Fig. 4
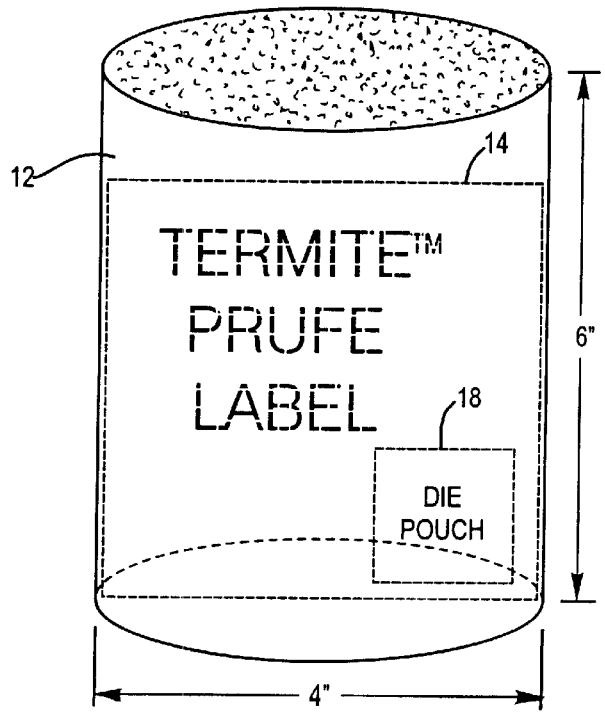
Fig. 2

INSECTICIDE INCLUDING DISODIUM OCTABORATE TETRAHYDRATE AND METHOD FOR TREATING WOOD THEREWITH

This is a divisional application of U.S. patent application Ser. No. 08/994,056, filed Dec. 19, 1997 now abandoned, which is incorporated herein by reference.

FIELD OF THE INVENTION

The present invention pertains generally to the field of insecticides, and more particularly to a substance that prevents or eliminates wood-destroying infestation.

BACKGROUND OF THE INVENTION

Insecticides are generally used either to prevent future infestation by harmful insects or to eliminate present infestation by killing such insects, or both. It is desirable from an efficiency standpoint to provide a long-lasting, or even permanent, insecticide. However, conventional permanent, or nonbiodegradable, insecticides have been found to be carcinogenic products. Their use has hence been banned.

It would further be advantageous to provide an insecticide for wood-infesting insects that also eliminates various types of fungi that contribute to wood rot. It would also be desirable to provide an insecticide that includes various built-in safety measures to deter consumption by humans or domestic animals. Thus, there is a need for a permanent yet noncarcinogenic insecticide that targets insects and fungi, and deters consumption by humans or domestic animals.

SUMMARY OF THE INVENTION

The present invention is directed to a permanent yet noncarcinogenic insecticide that targets insects and fungi, and deters consumption by humans or domestic animals. Accordingly, the invention provides an insecticide preferably including disodium octaborate tetrahydrate and a mixture of powdered pigment and either sucrose octa-acetate or denatonium benzoate.

In a first aspect of the invention, an insecticide mixture advantageously includes at least 95% by weight disodium octaborate tetrahydrate, which may be either powdered or dissolved in a water solution. Preferably, the pigment is colored blue and provided in a sealed pouch along with a folded label, the label and pouch being included within a container of the powdered insecticide mixture.

In a second, separate aspect of the invention, an insecticide can be sold in powdered form in an externally labeled container that also holds a duplicate label. Advantageously, the powdered insecticide can subsequently be mixed into, e.g., a gallon container of water and the duplicate label can be affixed to the outside of the new container so that the new container can be stored for an extended period of time while the owner remains aware of its contents.

BRIEF DESCRIPTION OF THE DRAWINGS

FIG. 1 is a perspective view of an externally labeled container enclosing a powdered insecticide and a duplicate label for subsequent attachment to an alternate container.

FIG. 2 is a perspective view of a container that contains a folded label and a sealed pouch of coloring powdered pigment.

FIG. 3 is a plan view of a container that contains a sealed pouch that holds a label and a pouch of coloring powdered pigment.

FIG. 4 is a plan view of a container that contains a label wrapped around all inside surface of the container.

DETAILED DESCRIPTION OF THE PREFERRED EMBODIMENTS

In a particular embodiment, an insecticide includes a combination of either sucrose octa-acetate (S.O.A.) or Bitrex (a trademarked product comprising denatonium benzoate) and a nonwhite pigment with a mixture of disodium octaborate tetrahydrate (D.O.T.). Preferably, the insecticide mixture comprises at least 95% by weight D.O.T., with the pigment and the S.O.A. or Bitrex combined comprising at most 5% by weight, preferably less than 1% by combined weight. The pigment is preferably added in liquid form for ease of handling, although powdered pigment may be used.

In a specific embodiment, powdered D.O.T. is used in the insecticide mixture. In an alternative embodiment, a 5% to 20% water solution of a mixture comprising at least 95% D.O.T. (before dissolution) is used.

Preferably, the powdered pigment is non-white in color. For instance, a green colored pigment helps to prevent inadvertent consumption of the insecticide by distinguishing the insecticide from common household food items such as flour, sugar, or salt.

Both S.O.A. and Bitrex have been found to serve as bittering agents without diminishing the effectiveness of the insecticide. Thus, while S.O.A. and Bitrex exhibit a taste that is repulsive to humans or domestic animals, thereby preventing inadvertent consumption of a harm-causing quantity of insecticide, neither substance repulses insects.

In a particular embodiment, the insecticide kills fungi that cause wood rot in addition to wood-destroying insects such as, e.g., termites, beetles, and carpenter ants The insecticide can advantageously be used for, e.g., interior and exterior lumber, plywood, logs, and wood-form composite structural components. The insecticide can be used for infested wood, as a preventive treatment for wood in existing structures, and for pretreatment during construction. The insecticide can advantageously be mixed with water to form a solution that continues to penetrate deep into wood and does not break down, giving long-lasting protection. The Version With Markings To Show Changes Made follows this response.

In a specific embodiment, the insecticide can be mixed in solution with water. The mixing is advantageously performed by filling a one-gallon container such as, e.g., a bucket with about 80% water, adding approximately one pound of the insecticide powder while stirring, and then adding water to make roughly one gallon of solution. The solution should then be stirred until it is dissolved crystal clear, i.e., for about five minutes. Warm water should be used for optimum efficiency. The ensuing gallon of solution should cover approximately two hundred square feet of surface area.

The solution can be stored indefinitely in a sealed plastic container for future use. Prior to use, the solution should preferably be brought to room temperature.

In a particular embodiment, which is illustrated in FIG. 1, the powdered insecticide 10 may advantageously be sold in a container 12 that bears a label 14 identifying the product as an insecticide and/or by brand name. A second, duplicate label 16 can be enclosed in the container 12 with the insecticide 10. Once the solution described above has been mixed, the duplicate label 16 can be applied to the external surface of the sealed container holding the solution. In this way, the owner can safely store the sealed container for an extended period of time without forgetting the nature of its contents.

In a specific embodiment, which is shown in FIG. 2, the label 14 can be placed along with a sealed pouch 18 of die powder, or coloring powdered pigment, in the container 12 such that the label 14 is fitted from side to side and positioned approximately one inch below the top of the container 12. In this way, the insecticide powder 10 (shown in FIG. 1) will advantageously fill evenly in the container 12 during production. Preferably, the container 12 is four inches in diameter and six inches tall. The label 14 is advantageously folded and preferably has dimensions, when folded, of five inches by ten inches.

In an alternative embodiment, which is depicted in FIG. 3), the pigment pouch 18 (shown in FIG. 2) and the label 14 (shown in FIG. 2) can be placed together in a sealed pouch 20 within the container 12. The separate pouch of pigment 18 (see FIG. 2), whether in liquid or powdered form, allows the user the option of heavily coloring the insecticide solution in order to stain wood to be treated so that treated wood is easily identifiable as having been treated.

In another alternative embodiment, which is illustrated in FIG. 4, a plastic pouch is not used, which reduces production costs. Instead, the label 14 is placed inside the container 12 by wrapping the label 14 around the inside surface of the container 12. The insecticide powder 10 (shown in FIG. 1) does not have any adverse effect on the label 14.

The insecticide solution is advantageously applied with either a paint brush or a trigger spray bottle. For attics, crawl spaces, decks, fences, logs, and new construction, a garden-tank sprayer may be used to best advantage.

When the insecticide solution is to be applied to a wood surface, the wood surface should be dried before treating. The solution should then be applied until the unsealed wood surface is thoroughly wet. A second application should be made between one and twenty-fours later. If the wood surface is sealed, it should first be sanded and/or holes should be drilled and the solution should be injected into infested wood and wall voids. Such holes should advantageously measure 3/32 of one inch in diameter. After application, any residue can be easily removed with warm water and a mild soap solution. The wood should be allowed to dry completely (e.g., for at least forty-eight hours after application of the insecticide solution) before paint, varnish, or waterproofing seal are applied.

In the event untreated wood has become infested, it should be removed, and two applications as described above should be made to the surrounding area and to all sides of the new wood before the new wood is installed. For pretreatment during construction, the insecticide solution may advantageously be applied to all accessible surfaces of bare wood, plywood, and wood composite until such surfaces are thoroughly wet. A second application should be made after approximately one hour. The treated wood should advantageously be protected from rain. Preferably, the insecticide solution should be applied after roofing and framing are in place, before insulation and dry walls are installed.

Termite bait stations may advantageously be made by treating corrugated box board or thin wood strips with a one-half-percent-to-one-percent D.O.T. solution. The reduced concentration of D.O.T. is still lethal, but is not detectable and readily consumed by termites. Although such a reduced-concentration solution would not be very effective as a treatment to construction wood, placing such baits under a building is extremely effective for killing subterranean termites.

Preferred embodiments of the present invention have thus been shown and described. It would be apparent to one of ordinary skill in the art, however, that numerous alterations may be made to the embodiments herein disclosed without departing from the spirit or scope of the invention. Therefore, the invention is not to be limited except in accordance with the following claims.

What is claimed is:

1. A method for eradicating wood-destroying insects, the method comprising the steps of:

providing a liquid insecticide solution comprising an approximately 0.5% to 1.0% by weight water solution of a disodium octaborate tetrahydrate mixture, the mixture having comprised, before dissolution in water, at least 95% by weight disodium octaborate tetrahydrate, pigment, and an ingredient selected from the group consisting of sucrose octa-acetate and denatonium benzoate;

applying the liquid insecticide solution to a bait member; and placing the bait member in a location where the bait member may be contacted by wood-destroying insects.

2. The method according to claim 1, wherein the bait member is formed from a material selected from the group consisting of wood and corrugated box board.

\* \* \* \* \*